United States Patent
Iglio et al.

(10) Patent No.: US 10,370,197 B2
(45) Date of Patent: Aug. 6, 2019

(54) PLANTS FOR IMMERSION OF BODYWORKS

(71) Applicant: GEICO S.p.A., Cinisello Balsamo (IT)

(72) Inventors: Valerio Iglio, Cinisello Balsamo (IT); Paolo Colombaroli, Cinisello Balsamo (IT); Giampaolo Covizzi, Cinisello Balsamo (IT)

(73) Assignee: GEICO S.P.A. (IT)

( * ) Notice: Subject to any disclaimer, the term of this patent is extended or adjusted under 35 U.S.C. 154(b) by 0 days.

(21) Appl. No.: 15/538,481

(22) PCT Filed: Dec. 15, 2015

(86) PCT No.: PCT/IB2015/059610
§ 371 (c)(1),
(2) Date: Jun. 21, 2017

(87) PCT Pub. No.: WO2016/103108
PCT Pub. Date: Jun. 30, 2016

(65) Prior Publication Data
US 2017/0369255 A1    Dec. 28, 2017

(30) Foreign Application Priority Data

Dec. 23, 2014  (IT) .............................. MI2014A2221

(51) Int. Cl.
*B65G 49/04* (2006.01)
*B05C 3/10* (2006.01)
(Continued)

(52) U.S. Cl.
CPC ....... *B65G 49/0463* (2013.01); *B65G 49/025* (2013.01); *B65G 49/0418* (2013.01);
(Continued)

(58) Field of Classification Search
USPC .......................... 118/423, 425, 426, 428, 429
See application file for complete search history.

(56) References Cited

U.S. PATENT DOCUMENTS

| 2,598,163 | A | 5/1952 | Halls |
| 4,874,639 | A | 10/1989 | Matsui et al. |

(Continued)

FOREIGN PATENT DOCUMENTS

| CN | 1503759 A | 6/2004 |
| CN | 101804393 A | 8/2010 |
| WO | 2005/115886 A1 | 12/2005 |

OTHER PUBLICATIONS

English Translation CN101804393 A, detailed Description (Year: 2010).*

(Continued)

*Primary Examiner* — Yewebdar T Tadesse
(74) *Attorney, Agent, or Firm* — MH2 Technology Law Group LLP (57) ABSTRACT

A plant for immersion treatment of vehicle bodies may include at least one skid configured to support a body; at least one process liquid tank; a line configured to convey the at least one skid above the at least one tank; and/or a device configured to overturn and immerse, inside the at least one tank, the body on the at least one skid positioned over the at least one tank using the conveyor line. The at least one skid may include a base part and a support part. The support part may be supported rotatably on the base part using a rotatable shaft with axis arranged transverse to a direction of movement of the at least one skid on the conveyor line, so that the support part is rotatable between a first upper position and a second position for immersing the body in the at least one tank.

20 Claims, 6 Drawing Sheets (51) Int. Cl.
*B65G 49/02* (2006.01)
*B62D 65/18* (2006.01)
*C25D 17/28* (2006.01)

(52) U.S. Cl.
CPC ............ *B65G 49/0459* (2013.01); *B05C 3/10* (2013.01); *B62D 65/18* (2013.01); *B65G 2201/0294* (2013.01); *C25D 17/28* (2013.01)

(56) References Cited

U.S. PATENT DOCUMENTS

| | | | |
|---|---|---|---|
| 5,110,440 | A | 5/1992 | Case |
| 5,531,830 | A | 7/1996 | Ichinose et al. |
| 8,459,439 | B2* | 6/2013 | Guerra .................. B62D 65/18 118/425 |
| 8,590,482 | B2* | 11/2013 | Nishihara .......... B65G 49/0459 118/400 |
| 2001/0015172 | A1 | 8/2001 | Masaki et al. |
| 2004/0149549 | A1 | 8/2004 | Dehne et al. |
| 2005/0061616 | A1 | 3/2005 | Krannich et al. |
| 2008/0247847 | A1 | 10/2008 | Muller et al. |
| 2014/0190406 | A1* | 7/2014 | Covizzi .................... B05C 3/10 118/426 |

OTHER PUBLICATIONS

English Translation CN101804393 A, claims (Year: 2010).*
International Search Report and Written Opinion in International Application No. PCT/IB2015/059610, 15 pages.
First Office Action dated Aug. 16, 2018, in corresponding Chinese Application No. 2015800608448 (8 pages), English translation provided.

* cited by examiner

PLANTS FOR IMMERSION OF BODYWORKS

CROSS-REFERENCE TO RELATED APPLICATION(S)

This application is a national stage entry from International Application No. PCT/IB2015/059610, filed on Dec. 15, 2015, in the Receiving Office ("RO/IB") of the World Intellectual Property Organization ("WIPO"), published as International Publication No. WO 2016/103108 A1 on Jun. 30, 2016, and claims priority under 35 U.S.C. § 119 from Italian Patent Application No. MI 2014 A 002221, filed on Dec. 23, 2014, in the Italian Patent and Trademark Office, the entire contents of all of which are incorporated herein by reference.

The present invention relates to a plant for the immersion treatment of bodywork, in particular for motor vehicles and the like.

In the art systems for the immersion treatment of vehicle bodies, in order to perform for example anti-corrosive and cataphoresis pre-treatments, are known.

These plants generally have one or more tanks containing treatment liquids and a conveyor which moves the bodies, mounted on special slides or skids, along the plant and above the tanks. Immersion systems are provided opposite the tanks and may perform for example overturning of the body inside the tank.

For the overturning operation, the body may be picked up by special means which raise it from the conveyor skid, or the skid itself may have motorized rotational shafts. Often the known immersion systems are complex, costly and bulky and require frequent maintenance.

Moreover, the final quality of the immersion treatment depends to a large extent on the method of immersion of the part to be treated. It is for example necessary to prevent air bubbles from remaining trapped during immersion or, on the other hand, the formation of liquid accumulations after re-immersion. The difficulty of achieving satisfactory results has the effect that the known devices are even more complex since they are provided, for example, with a sophisticated control system for the immersion movements, duration in the liquid and emersion. A known technique proposes, for example, skids with on-board immersion systems which require a relatively complex kinematic structure and electric motors on the skid which increase significantly the costs of said skid. Considering that along the line each body is supported by a skid, the total cost of the plant rapidly reaches a very high figure. In order to overcome this problem, movement systems which are fixed to the ground in the vicinity of the tanks, along with skids without associated immersion systems, have also been proposed. The movement systems fixed to the ground remove the body from the skid or engage the skid with the body and move it inside the tank and then deposit the body or the entire skid back on the conveyor system along the line. The immersion systems thus designed are, however, relatively complex and require sophisticated electronic management systems in order to ensure precise and reliable operation. This, however, once again increases further the costs and the complexity of the entire plant and may in any case negatively affect the reliability.

The general object of the present invention is to provide a small-size and low-cost immersion treatment plant which ensures a high degree of flexibility and optimum treatment quality.

In view of this object the idea which has occurred is to provide, according to the invention, a plant for the immersion treatment of vehicle bodies, comprising: at least one skid intended to support a body to be treated, at least one process liquid tank; a line for conveying the skid above the tank; means for overturning and immersing, inside the tank, the body on the skid which has been positioned above the tank by means of the conveyor line; the plant being characterized in that the skid comprises a base part for support and movement along the conveyor line and a part for supporting the body, the support part being supported rotatably on the base part by means of a rotatable shaft with axis arranged transverse to the direction of movement of the skid on the conveyor line so that the support part is rotatable between a first upper position and a second position for immersing the body inside the tank, the skid further comprising a toothed wheel which is connected kinematically to the shaft for controlled rotation thereof and, alongside the tank, there being provided at least one rotation actuating device which comprises a rack intended to engage said toothed wheel so as to actuate rotation of the skid support part by means of movement of the skid along a section of the conveyor line in the region of the rack.

Preferably, the skid comprises a controllable device for locking/unlocking the free rotation of the shaft which is advantageously set to the unlocking position by means of interference between its actuating shoe and at least one actuating surface present alongside the tank.

In order to illustrate more clearly the innovative principles of the present invention and its advantages compared to the prior art, an example of embodiment applying these principles will be described below with the aid of the accompanying drawings. In the drawings.

Figure 1:
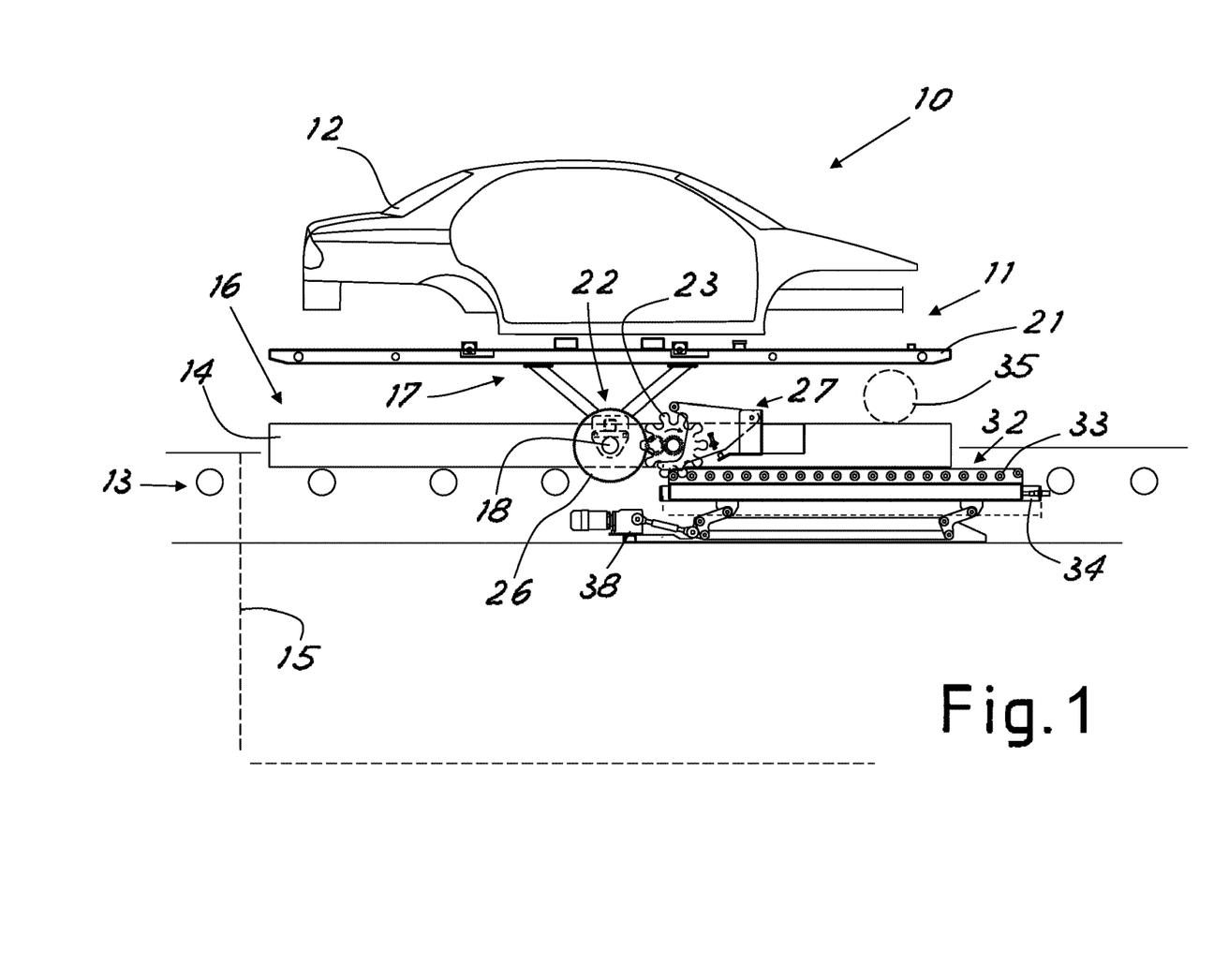
FIG. 1 shows a schematic side elevation view of a treatment station of a plant designed according to the invention.

With reference to the figures, FIG. 1 shows in schematic form a first example of a plant section or station for the immersion treatment of bodies, denoted generally by 10 and designed in accordance with the invention.

The plant 10 comprises at least one skid 11 intended to support a body 12 to be treated. Usually the skids will consist of a plurality circulating along the plant, each skid with a corresponding body to be treated.

The plant also comprises a conveyor line 13 for sequential conveying of the skids along the plant and above the tanks. The conveyor line may comprise travelways arranged parallel on the two sides of the tanks. The conveyor line may for example comprise a series of motorized rollers on which the skids rest and travel sequentially.

Figure 2:
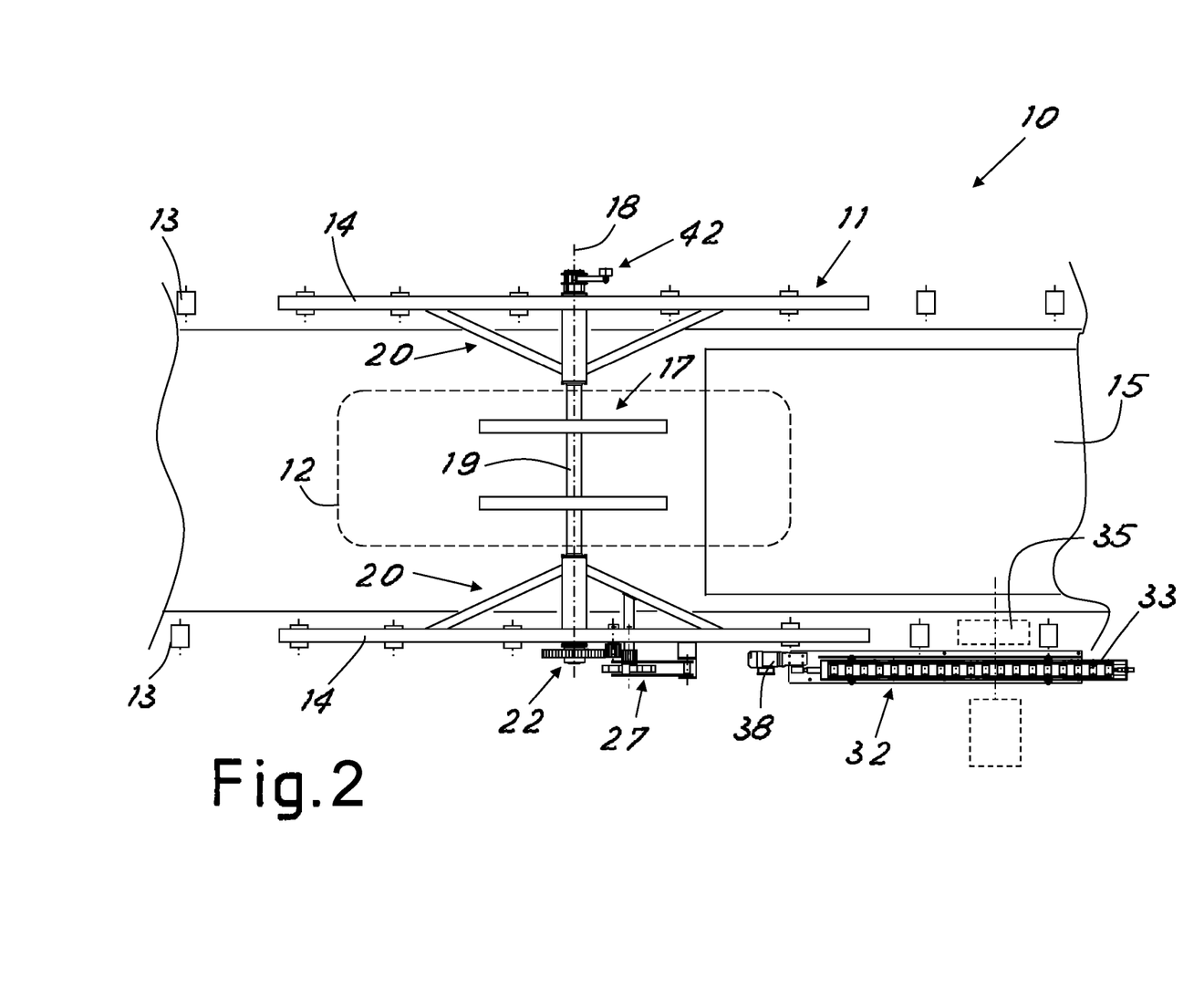
FIG. 2 shows a schematic plan view of the station according to FIG. 1 in a different operating condition.

As can be seen in FIG. 2, the skids may comprise lateral elements or lateral runners 14 for resting on the conveyor line 13, for example provided with motorized rollers which are arranged in two parallel rows on the two sides of the travelway and outside of the sides of the tanks of the plant.

The motorized rollers of the conveyor line may be all connected to a single motor, for example by means of a chain system, as may be easily imagined by the person skilled in the art.

Different sections of the conveyor system may also be motorized separately in order to obtain asynchronous conveying of the skids which may thus be moved at different speeds and/or stopped along the various sections.

The plant 10 also comprises at least one known process liquid tank 15 inside which the body must be immersed, for example for an anti-corrosive and cataphoresis pre-treatment. Below reference will be made to a tank, but it is understood that the tanks may consist of a plurality along the plant, also depending on the number and type of treatments required, as will be evident to the person skilled in the art.

The skid comprises advantageously a base part 16 traveling along the conveyor line and a part 17 for supporting the body, which is rotatable about a transverse axis 18 of a rotatable shaft 19 supported by the base part.

Advantageously, as can be clearly seen again in FIG. 2, the base frame of the skid may be H-shaped in plan view, with the sides of the H which are formed by the elements or runners 14 and a central crosspiece which connects together these elements or runners 14 and which comprises or is formed by the rotatable shaft 19 and its associated elements 20 for mounting on the frame. Among other things, this shape facilitates the rotation of the body about the axis 18.

Advantageously, the frame has a transverse dimension such that the runners are situated outside the tanks.

As can be clearly seen in FIG. 1, the supporting or upper part of the skid may comprise support elements which are advantageously V-shaped and which extend from the rotatable shaft and are directed upwards in the normal conveying position shown in FIG. 1, for supporting and locking in position the body using known fixing means, if necessary with a support surface 21 arranged in between. The skid 11 also comprises a rotating mechanism 22 operated by the shaft 19 for bringing the body from a normal conveying position, as shown in FIG. 1, into an overturned immersion position, shown in FIG. 4.

The rotating mechanism 22 comprises a toothed actuating wheel 23 which is kinematically connected to the shaft 19, optionally by means of a transmission with a suitable gear ratio (as will become clear below) for example formed by a chain of gears 24, 25, 26, the first one being rigidly connected to the actuating wheel 23 and the last one being rigidly connected to the shaft 19. Advantageously, the transmission between the wheel 23 and the shaft 19 will be such that the wheel 23 and the shaft 19 rotate in the same direction and preferably with a reduction in the number of revolutions.

Considering again FIGS. 1 and 2, the plant also comprises a rotation actuating device 32 which is arranged alongside the tanks in every position along the plant where it is required to perform controlled rotation of the body about the axis 18 of a skid.

As can be clearly seen in FIGS. 1 and 2, the device 32 comprises a rack 33 arranged along the direction of movement of the skids on the conveyor line 13.

The rack 33 will have a form suitable for engagement with the toothed wheel 23 in order to rotationally actuate the wheel upon travel of the wheel along the rack owing to the movement of the skid along the conveyor line.

Figure 3:
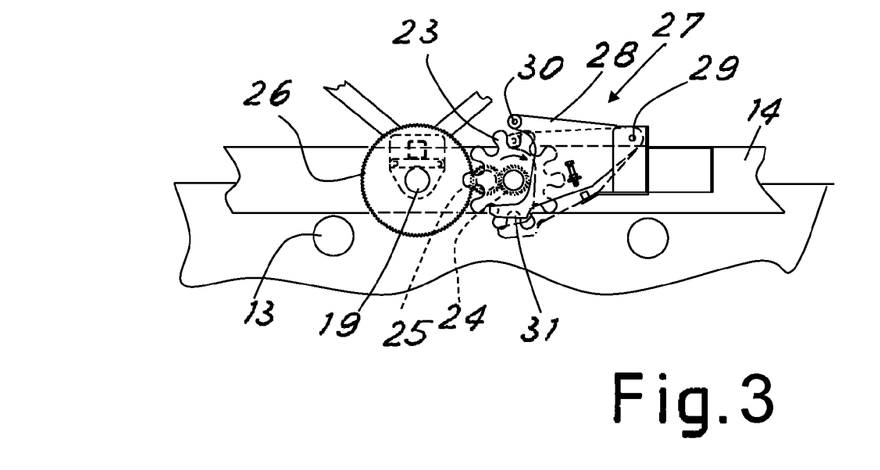
FIG. 3 shows a schematic view, on a larger scale, of a detail of a skid of the plant according to the invention.

The skid also advantageously supports a device 27 for locking/unlocking the free rotation of the shaft 19. In particular, as can be seen more clearly in FIG. 3, this device preferably interacts with the actuating wheel 23 and is preferably formed by a frame 28 pivotably mounted on the skid at 29 and provided with an engaging element 30 and an actuating shoe 31. In the rest condition, the engaging element 30 engages in the wheel 23 and the relative position on the frame of engaging element 30, shoe 31 and pivoting mechanism are such that raising of the shoe displaces the engaging element into the disengaging position.

Advantageously, owing to the weight of the frame in the rest condition (shown in broken lines in FIG. 3) the engaging element 30 is therefore engaged with the wheel 23, locking it. The locking action may be deactivated by raising the shoe 31 (as will become clear below) so as to displace the frame about the pivot pin and thus disengage the engaging element 30 from the wheel 23 (as shown in continuous lines in FIG. 3). Usually, as will become clear from below, the shoe will be moved by an actuating surface alongside the tank. In particular, an actuating surface may be associated with the device 32 for actuating rotation of the skid.

Advantageously, as shown in the figures, the rack may be a roller rack and the wheel 23 may be a wheel which is correspondingly lobed so as to engage sequentially with its lobes between the rollers. This ensures safe, reliable and relatively silent engagement.

Moreover, the rollers may form the said surface for actuation of the shoe 31 into the raised position. Alternatively, an independent shoe actuating surface may be provided parallel to and alongside the rack.

Advantageously, the rack may be adjustable position-wise along its longitudinal extension, for example by means of a screw adjustment system 34.

Moreover, again advantageously, the actuating device 32 may be movable controllably between the raised or operative position engaged in the wheel 23, shown in continuous lines in FIG. 1, and a lowered or non-operative position (shown in broken lines) where the wheel may pass along the rack without engaging with it. The movement may be performed for example by means of a hinged parallelogram mechanism actuated by a motor 38.

If it is required for any reason to convey a skid above a tank without performing rotation thereof it is thus sufficient to move the actuating device towards it non-operative position. For example, this may be useful in the case where there are bodies which must be treated in some tanks and bodies which must be treated in other tanks along the same conveyor line.

Figure 4:
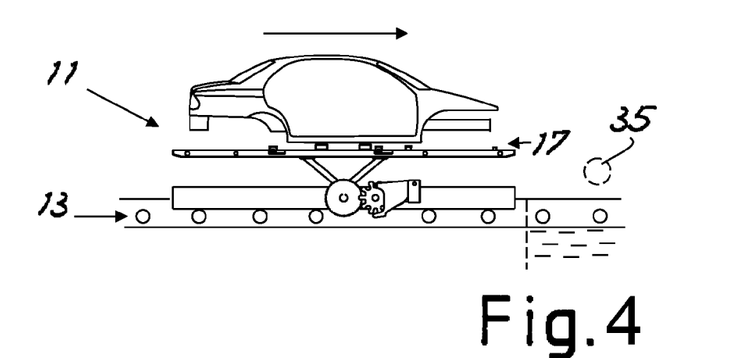
FIGS. 4 and 5 show two different operating phases along the plant according to the invention.

As can be seen in FIG. 4, in the normal condition for conveying along the line, nothing interferes with the shoe 31 and the skid may proceed conveying the body in the upper position, as though it were a normal rigid skid.

Figure 5:
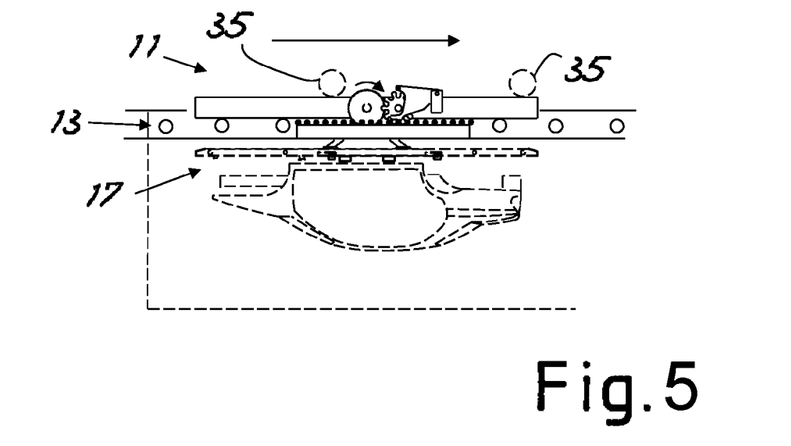

As can be clearly seen in FIG. 5, when the skid reaches an actuating device 32, the skid locking/release device is actuated so as to free rotation of the shaft at the same time as engagement of the wheel with the rack in order to cause rotation of the body.

Release of the wheel and engagement of the rack are advantageously synchronized so as to be simultaneous, so that the shaft 19 is never idle, so as to avoid uncontrolled rotations, and ensure, on the other hand, that no jamming occurs. The position of the rack may be adjusted for this purpose.

The length of the rack may be established so as to produce a half rotation of the shaft or a complete rotation, or any angle of rotation which is desired.

In particular, at the start of a long tank a rack having a length such as to produce a half rotation of the shaft may be provided, so as to overturn completely the body and immerse it completely inside the tank. The skid may then proceed along the tank with the body immersed.

At the end of the tank a second rack may be provided, said rack having a length such as to produce another half rotation of the shaft so as to completely raise the body into the normal forward conveying position.

Alternatively, for example in the case of short tanks, a single rack may be designed with a length such as to cause the body to perform a full turn during the forward movement of the skid.

If necessary, the skid may also be stopped when the body is fully immersed, such as to cause it to remain in the liquid for the entire duration needed for the particular treatment.

It is also possible to consider causing the body to perform several immersion and emersion rotations, by means of a suitable longer rack or several racks in sequence, or cause only partial overturning operations, for example in order to keep the immersed body inclined, so as to allow the evacuation of air bubbles.

Advantageously, additional motorized driving means 35 (for example motorized drive rollers) may be provided, these being arranged so as to engage the skid when the rack is engaged with the wheel, so as to produce an additional driving power during the force for rotation of the body. For example, motorized rollers 35 may be arranged so as to rest on top of one of the runners 14 of the skid, formed with a suitable upper surface. The roller 35 may advantageously rest on the runner on the rack side so as to avoid possible raising of the runner owing to the force for rotation of the body imparted by the rack on the actuating wheel.

At this point it is clear how it is possible, simply by suitably actuating the conveyor line and any drive rollers 35, to overturn a body with a predefined and also complex movement range and speed.

Figure 6:
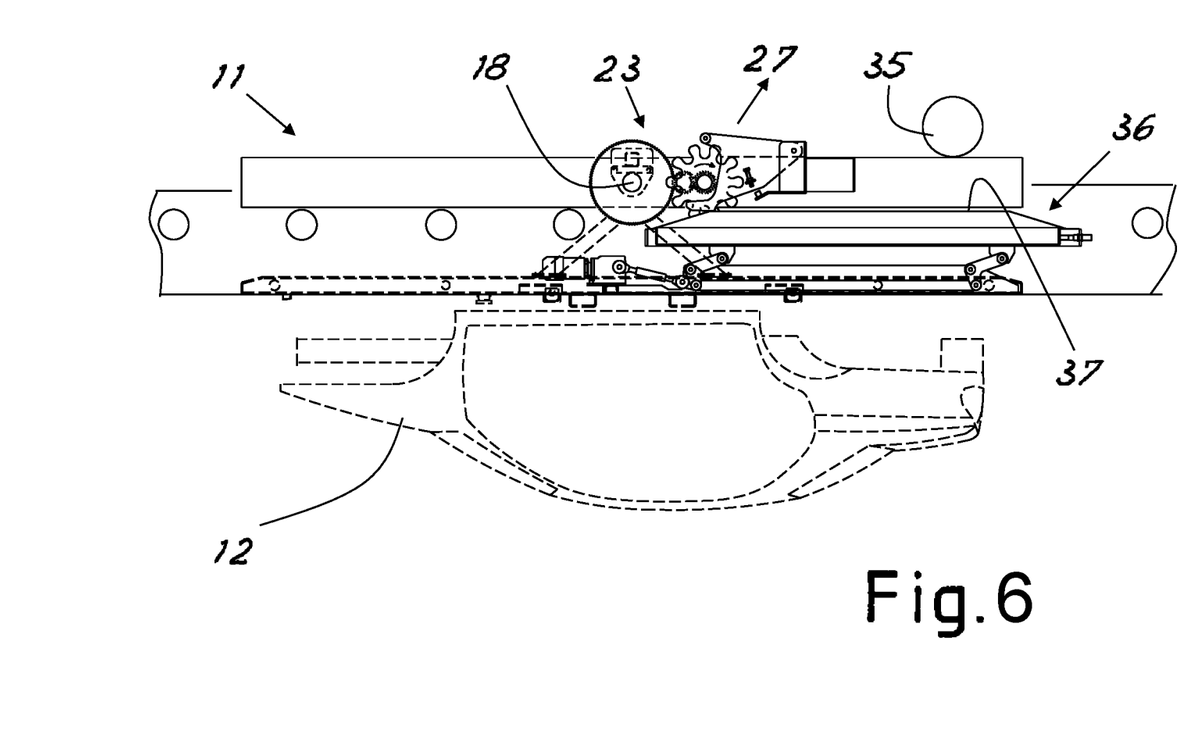
FIG. 6 shows a schematic side elevation view of a possible variant of a treatment station of a plant designed according to the invention.

FIG. 6 shows a possible variant of the plant according to the invention, where (advantageously in a position along the tank downstream of an actuating device 32) a device 36 is provided for unlocking rotation of the shaft 19, but not for engaging the rotational wheel 23.

Preferably, this device is formed with a structure similar to that of the actuating device 36, but the rack is replaced by an actuating surface 37 configured for actuation of the device 27 in order to unlock rotation. In particular, the surface 37 may comprise an initial section which is inclined upwards, a horizontal central section and an end section inclined downwards so as to move the shoe 31 into the unlocking position.

This device 36 may also advantageously perform a controlled vertical movement so as to move between an operative position (shown in FIG. 6) and a non-operative position where it does not interfere with the shoe 31. In this way, when release is not required (for example in the case of a skid which must only pass over the tank) it is sufficient to displace the device into its non-operative position. Obviously, for safety reasons, the device 36 should perform release only when the body is already in its fully overturned position, so that the body may in this case be hanging, but may not produce a further uncontrolled rotation downwards. Advantageously a device for controlled pivoting of the body may be combined with the rotation unlocking device 36.

Figure 7:
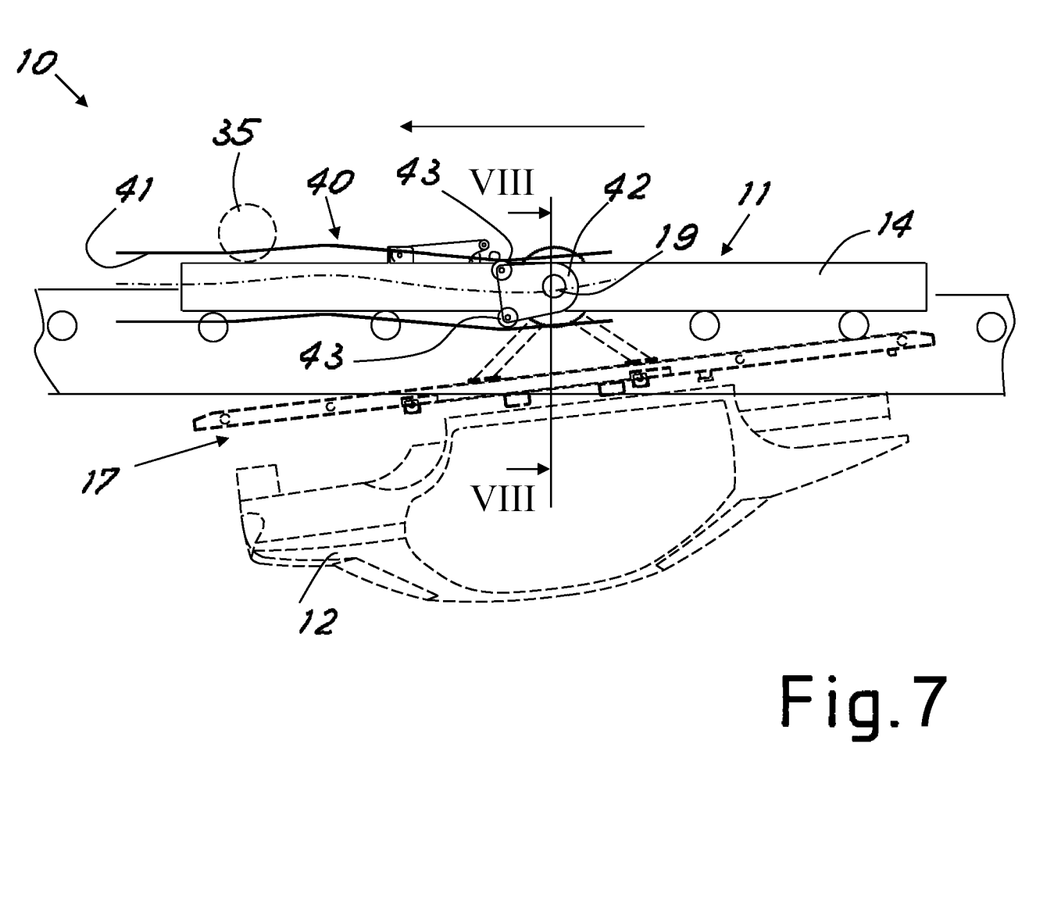
FIG. 7 shows a schematic side elevation view, from an opposite side, of the variant of FIG. 6 during a different operating phase.
Figure 8:
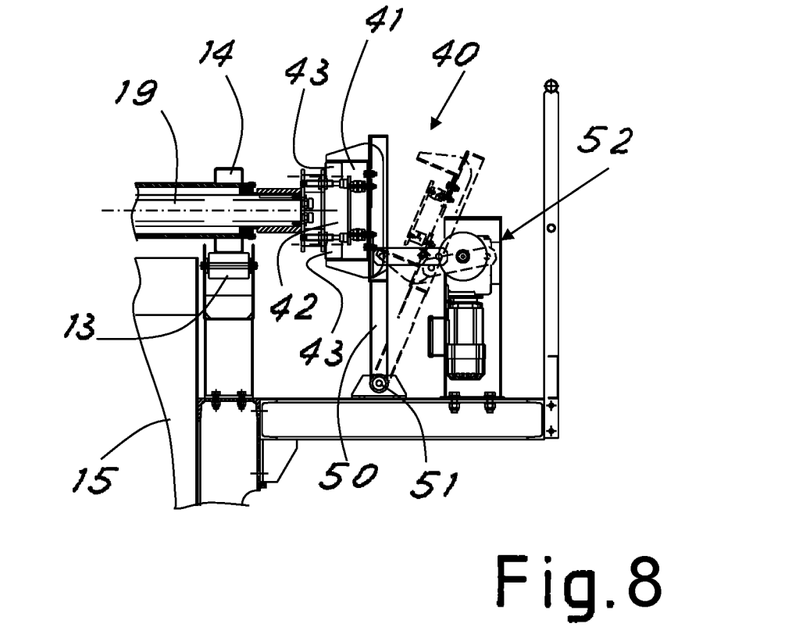
FIG. 8 shows a partial schematic view along the line VIII-VIII of FIG. 7.

FIGS. 7 and 8 show an advantageous embodiment of such a device, denoted generally by 40.

The device 40 is preferably arranged on the side of the tank opposite to the side where the unlocking device 36 is located and comprises a guiding and pivoting channel 41 which is arranged along the tank and inside which a carriage 42 rigidly connected to the shaft 19 enters and travels.

Preferably the carriage 42 has wheels 43 which travel along opposite walls of the channel 41 and are arranged off-centre with respect to the axis of the shaft 19 so as to provide an advantageous rotational arm of the shaft. The channel is formed with a desired winding progression along the tank such that, upon displacement of the skid along the tank, the carriage 42 causes corresponding pivoting rotations of the shaft and therefore pivoting movements of the body.

Obviously, the length and position of the channel must coincide with at least the central section of the surface 37 of the unlocking device 36 so that the pivoting movement of the carriage 42 takes place with the shaft 19 unlocked.

Additional driving means 35 (for example motorized drive rollers) may be provided also along the section for movement of the skid with pivoting of the body, in the case where the pivoting movement requires a greater thrust than that which can be transmitted to the skid by the conveyor line 13.

As can be seen in the cross-section of FIG. 8, advantageously the guide channel 41 (which is for example C-shaped) is movable between an operative position, where it may receive the carriage 42, and a non-operative position, where the carriage may pass by without interfering with the channel. For example, for this movement, the guide channel may be mounted on a overturning frame 50 which can be inclined about an axis 51 by means of actuating system 52 arranged between the operative position (shown in continuous lines) and the non-operative position (shown in broken lines).

In this way, when pivoting of a passing body is not required, the channel may be displaced into the non-operative position. This is necessary for example when the corresponding unlocking device 36 is in its non-operative position.

At this point it is clear to the person skilled in the art how it is possible to combine the various parts of the plant according to the invention in order to obtain desired progressions of the bodies along the line, with great ease and flexibility.

Figure 9:
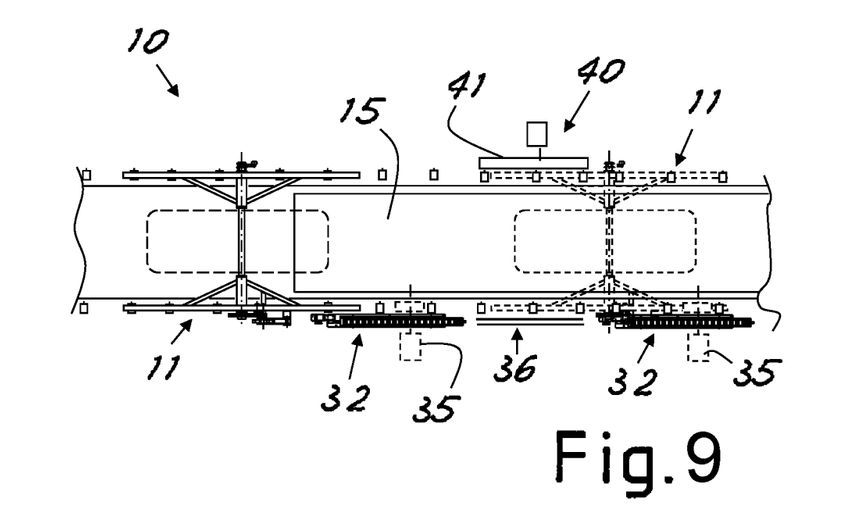
FIG. 9 shows a schematic plan view of a plant section according to the invention with the plant parts shown in the preceding figures.

FIG. 9 shows in schematic form an example of a possible configuration of a plant 10 according to the invention.

In this embodiment, a first rotation actuating device 32, a second unlocking device 36 with the associated controlled pivoting device 40 and a second rotation actuating device 32 are arranged in sequence at a suitable distance along a long tank 15.

In this way, a skid 11 upon reaching the tank is controlled by the first device 32 so as to overturn the body inside the tank and immerse it in the treatment liquid, the body is then pivoted along a predefined path by the guide 41 of the pivoting device 41 and, finally, it is raised back into its normal conveying position by the second device 32 so as to continue its movement along the plant.

At this point it is clear how the predefined objects have been achieved.

It can be clearly seen from the figures that the treatment tank may be also only slightly greater than the size of the bodies to be treated, laterally requiring only a small amount of play between walls of the tank and side walls of the body and at the front and the rear only space to allow the movement for overturning the body and, if necessary, the displacement movement with the body immersed. The quantity of treatment liquid may therefore be minimal (with a reduction for example of about 15% compared to most conventional systems). Furthermore, a plant according to the invention allows a reduction in the widthwise volume which may for example be equal to about 25% compared to plants with body immersion arms and/or elevators.

The skids for all intents and purposes constitute both the conveyor means and the body overturning means and therefore both the classic skid and the classic transportation carriage used in the prior art are eliminated.

The skids may be designed with only mechanical members (not requiring for example electrical or electronic devices) and therefore may be used for transporting bodies not only in the pre-treatment and cataphoresis plant, but also in the following drying and polymerization ovens.

Moreover, the conveyor and overturning system remains entirely outside of the vertical plane of the tank and may be easily protected against contact with the treatment liquids.

Since the conveyor system is not situated within the vertical plane of the tank, it is possible to avoid any contamination of the liquid caused by any impurities which are transported by the plant or which may fall from the conveyor system owing to wear of the moving parts.

The system is moreover very simple and has few moving parts with low production and maintenance costs.

Obviously the description above of an embodiment applying the innovative principles of the present invention is provided by way of example of these innovative principles and must therefore not be regarded as limiting the scope of the rights claimed herein.

For example, especially along the sections which do not coincide with the treatment tanks, the skid transportation system may be of any different known type. It is also possible to easily imagine how the various embodiments and devices described may be combined with each other in any number in order to perform treatments which are complex and/or with immersion of a body in successive treatment tanks.

The conveyor line may also be designed with systems different from the motorized rollers on which the skids rest and travel. For example, other systems, such as linear motors or friction rollers, etc., may be used, as may be now easily imagined by the person skilled in the art. If the engagement between skid and conveyor line allows a sufficient transfer of driving force for the overturning operations (if for example a suitably powerful chain conveyor system is used) the motorized rollers 35 may be more easily dispensed with.

The invention claimed is:

1. A plant for immersion treatment of vehicle bodies, the plant comprising:
    at least one skid configured to support a body to be treated;
    at least one process liquid tank;
    a conveyor line configured to convey the at least one skid above the at least one process liquid tank; and
    a device configured to overturn and immerse, inside the at least one process liquid tank, the body on the at least one skid positioned over the at least one process liquid tank using the conveyor line;
    wherein the at least one skid comprises a base part, for support and movement along the conveyor line, and a support part, for supporting the body,
    wherein the support part is supported rotatably on the base part using a rotatable shaft with axis arranged transverse to a direction of movement of the at least one skid on the conveyor line, so that the support part is rotatable between a first upper position and a second position for immersing the body in the at least one process liquid tank,
    wherein the at least one skid comprises a toothed wheel connected kinematically to the rotatable shaft for controlled rotation,
    wherein alongside the at least one process liquid tank, there is provided at least one rotation actuating device which comprises a rack configured to engage the toothed wheel in order to actuate the rotation of the support part using the movement of the at least one skid along sections of the conveyor line in a region of the rack, and
    wherein along the sections of the conveyor line where the rack engages the toothed wheel, a motor is provided for engaging the at least one skid and for additional driving of the at least one skid along the conveyor line.

2. The plant of claim 1, wherein the at least one skid comprises a controllable locking/unlocking device configured to lock/unlock free rotation of the rotatable shaft.

3. The plant of claim 2, wherein the controllable locking/unlocking device is set to an unlocking position using interference between an actuating shoe of the controllable locking/unlocking device and at least one actuating surface alongside the at least one process liquid tank.

4. The plant of claim 3, wherein the controllable locking/unlocking device comprises a frame pivotably mounted on the at least one skid, and
    wherein the frame comprises an engaging element configured to lock the toothed wheel and the actuating shoe for displacement of the engaging element between a first position, where the engaging element is engaged in the toothed wheel, and a second position, disengaged from the toothed wheel.

5. The plant of claim 4, wherein a relative position on the engaging element of the frame, the actuating shoe, and a pivot are such that raising of the actuating shoe displaces the engaging element into the second position.

6. The plant of claim 3, wherein the at least one actuating surface alongside the at least one process liquid tank is associated with the at least one rotation actuating device.

7. The plant of claim 3, wherein the at least one actuating surface alongside the at least one process liquid tank is formed by a rotation unlocking device which is movable controllably between an operative position, configured to cause interference between the at least one actuating surface and the actuating shoe, and a rest position, where there is no interference between the at least one actuating surface and the actuating shoe during the movement of the at least one skid along the at least one actuating surface.

8. The plant of claim 1, wherein the rack comprises a series of rollers, and
    wherein the toothed wheel is a lobed wheel configured to engage between the rollers of the series of rollers.

9. The plant of claim 1, wherein the at least one rotation actuating device is movable controllably between an operative position, configured to engage the toothed wheel, and a rest position, where there is no interference with the toothed wheel during the movement of the at least one skid along the rack.

10. The plant of claim 1, wherein the rotatable shaft supports a carriage for rotation of the rotatable shaft,
    wherein the carriage is configured to be inserted and to slide, using the movement of the at least one skid, inside at least one guide channel located alongside the at least one process liquid tank, and
    wherein the at least one guide channel is configured to produce pivoting rotations of the rotatable shaft during movement of the carriage inside the at least one guide channel.

11. The plant of claim 10, wherein the at least one guide channel is movable between an operative position, where the at least one guide channel is able to receive the carriage, and a non-operative position, where the carriage may pass along the at least one process liquid tank without interfering with the at least one guide channel.

12. The plant of claim 10, wherein the at least one skid comprises a controllable locking/unlocking device configured to lock/unlock free rotation of the rotatable shaft,
  wherein the controllable locking/unlocking device is set to an unlocking position using interference between an actuating shoe of the controllable locking/unlocking device and at least one actuating surface alongside the at least one process liquid tank, and
  wherein the at least one actuating surface alongside the at least one process liquid tank is associated with the at least one guide channel.

13. The plant of claim 10, wherein along different sections of the conveyor line where the carriage travels inside the at least one guide channel, the motor is provided for the additional driving of the at least one skid along the conveyor line.

14. The plant of claim 1, wherein the conveyor line comprises parallel travelways arranged on opposite sides of the at least one process liquid tank, and
  wherein the at least one skid comprises, on corresponding opposite sides of the base part, runners configured to rest on the parallel travelways so as to support and move the at least one skid above the at least one process liquid tank.

15. The plant of claim 14, wherein the base part of the at least one skid is generally H-shaped in plan view, with sides of the H forming the runners configured to rest on the parallel travelways, and the cross-piece of the H comprising the rotatable shaft from which V-shaped elements project, the V-shaped elements configured to form at least a part of the support part for supporting the body.

16. The plant of claim 14, wherein the parallel travelways are of a roller type.

17. A plant for immersion treatment of vehicle bodies, the plant comprising:
  at least one skid configured to support a body;
  at least one process liquid tank;
  a conveyor line configured to convey the at least one skid above the at least one process liquid tank; and
  a device configured to overturn and immerse, inside the at least one process liquid tank, the body on the at least one skid using the conveyor line;
  wherein the at least one skid comprises a base part, for support and movement along the conveyor line, and a support part, for supporting the body,
  wherein the support part is supported on the base part using a rotatable shaft so that the support part is rotatable between a first position, in which the body is not immersed in the at least one process liquid tank, and a second position, in which the body is immersed in the at least one process liquid tank,
  wherein the at least one skid comprises a toothed wheel connected to the rotatable shaft for controlled rotation,
  wherein at least one rotation actuating device, alongside the at least one process liquid tank, comprises a rack configured to engage the toothed wheel in order to rotate the support part using the movement of the at least one skid along the conveyor line, and
  wherein along sections of the conveyor line where the rack engages the toothed wheel, a motor is provided for engaging the at least one skid and for additional driving of the at least one skid along the conveyor line.

18. The plant of claim 17, wherein the at least one skid comprises a controllable locking/unlocking device for locking/unlocking free rotation of the rotatable shaft.

19. The plant of claim 18, wherein the controllable locking/unlocking device is set to an unlocking position using interference between an actuating shoe of the controllable locking/unlocking device and at least one actuating surface alongside the at least one process liquid tank.

20. The plant of claim 17, wherein the rotatable shaft supports a carriage for rotation of the rotatable shaft,
  wherein the carriage is configured to be inserted and to slide, using the movement of the at least one skid, inside at least one guide channel located alongside the at least one process liquid tank, and
  wherein the at least one guide channel is configured to produce pivoting rotations of the rotatable shaft during movement of the carriage inside the at least one guide channel.

* * * * *